US012452247B1

(12) United States Patent
Pavnoji et al.

(10) Patent No.: US 12,452,247 B1
(45) Date of Patent: Oct. 21, 2025

(54) ACCESS MANAGEMENT FOR APPLICATIONS USING ATTRIBUTE BASED ACCESS CONTROL

(71) Applicant: Amazon Technologies, Inc., Seattle, WA (US)

(72) Inventors: Suyash Arvind Arvind Pavnoji, Newport Beach City, CA (US); Kaushik Ramachandran, Redmond, WA (US); Prafulla Upadhyay, Draper, UT (US); Sriram Balasubramanian, Mountlake Terrace, WA (US); Harun Kumar Tumma, Redmond, WA (US); Mohit Arora, Surrey (CA)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 18/542,480

(22) Filed: Dec. 15, 2023

(51) Int. Cl.
*H04L 9/40* (2022.01)
(52) U.S. Cl.
CPC ........ *H04L 63/102* (2013.01); *H04L 63/0807* (2013.01)

(58) Field of Classification Search
CPC .. H04L 63/102; H04L 63/0807; H04L 9/3213
See application file for complete search history.

(56) References Cited

U.S. PATENT DOCUMENTS

| 2022/0166763 | A1* | 5/2022 | Hong | H04L 67/10 |
| 2023/0388283 | A1* | 11/2023 | DeGennaro | H04L 63/0861 |
| 2024/0380743 | A1* | 11/2024 | Bowman | H04L 63/20 |

* cited by examiner

*Primary Examiner* — Frantz B Jean
(74) *Attorney, Agent, or Firm* — Davis Wright Tremaine LLP

(57) ABSTRACT

Systems and methods are described relating to a credential exchange service (service) for providing customizable access to protected resources. A service may receive a user token generated by an identity provider and a resource identifier and determine a set of attributes of the user based on information indicating the user's association with an account associated with the resource. The service may generate a session token for interacting with the resource by: generating a set of tags based on attributes of the user, and attaching the set of tags to the session token. Upon receiving a request to perform a first action with respect to the resource and the session token, the session token may be used to authorize the user to perform the first action by comparing the set of attributes from the set of tags from the session token to an access policy associated with the resource.

20 Claims, 11 Drawing Sheets

US 12,452,247 B1

ACCESS MANAGEMENT FOR APPLICATIONS USING ATTRIBUTE BASED ACCESS CONTROL

BACKGROUND

Open Authorization (OAuth) is a framework that enables secure, delegated access to resources by allowing one application to act on behalf of a user, without exposing their credentials. It's widely used for granting third-party applications limited access to protected resources, such as user data, on various online platforms. OAuth facilitates user authorization, enhancing security and user privacy in the digital ecosystem through the use of tokens.

Typically, a user interacts with an OAuth application by requesting for a set of scopes, which grants them access to certain protected resources of an online resource. These scopes are finite in number and have to be pre-defined. For example: OrderRead, OrderWrite can be scopes which allows a user to create order and write order, respectively. However, in many instances, these scopes are not sufficient to provide fine grained access control. For example: if an access policy is defined in such a way that a user gets access to resources A, B and C provided the user has attributes X, Y and Z, each of these permissions needs to be modeled as individual scopes. This has the following drawbacks: 1) the size of the token increases with increased number of scopes and their definitions; 2) it is not technically feasible and maintainable to create individual scopes for a new attribute; and 3) the scopes only define the set of actions that the user can perform; however, the scopes do not dictate the resources that the user can access. If resources need to be encoded within scopes, then it would require creation of new scopes which again would drastically and unrealistically increase the number of scopes needed to be beyond a workable size.

BRIEF DESCRIPTION OF THE DRAWINGS

Various techniques will be described with reference to the drawings, in which.

DETAILED DESCRIPTION

Figure 1:
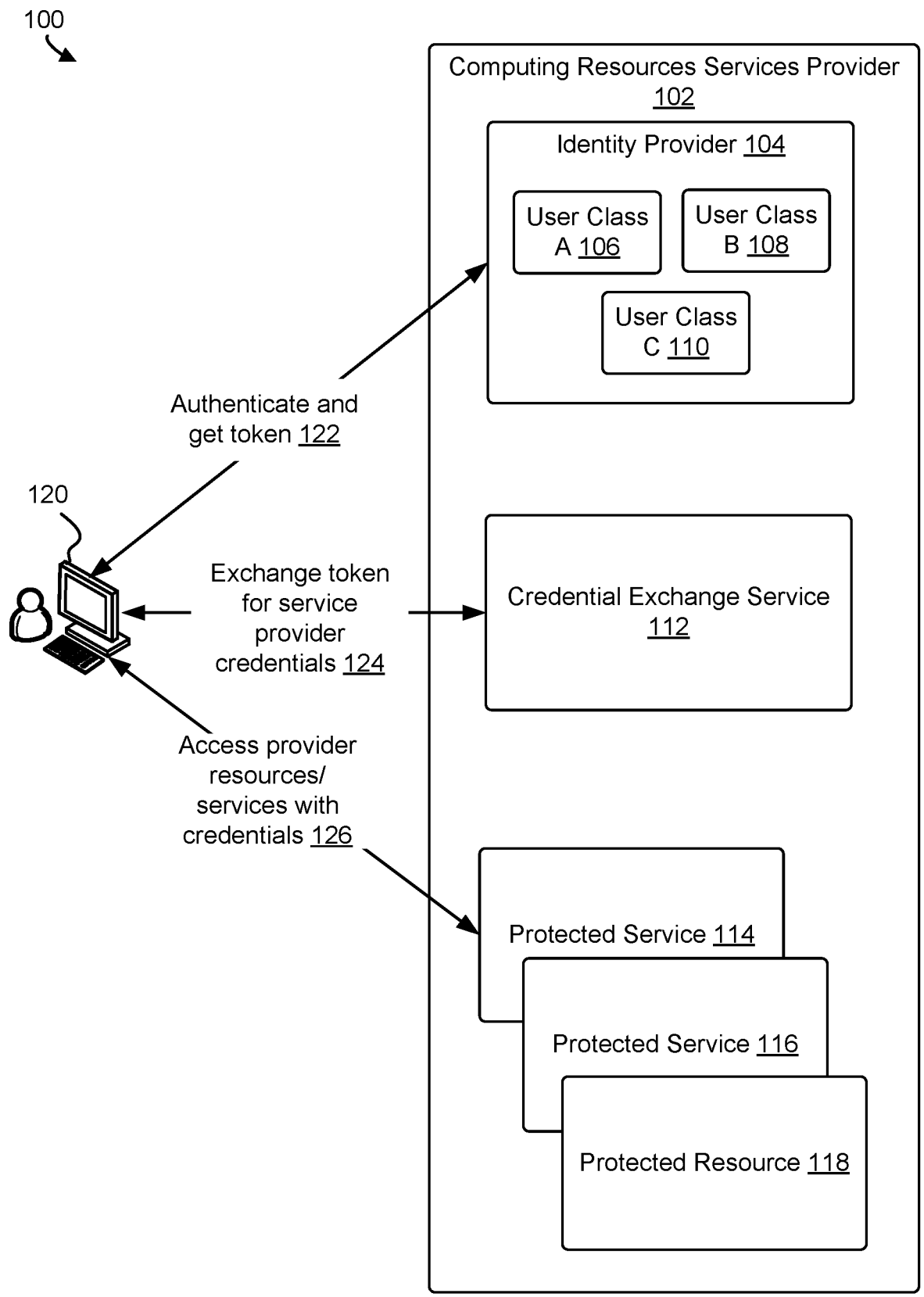
FIG. 1 illustrates an example of a credential exchange service that provides a translation layer between OAuth tokens and adaptable session tokens that can be used to enable more precise access control, according to at least one embodiment.

Systems and methods are described herein for enabling customization and precise control over access policies for protected resources through an intermediate credential exchange service. Using the described techniques, various tokens or credentials authenticating a user, such as from any of a number of identity providers, may be used and modified to generate session tokens or temporary credentials for accessing resources or performing actions in or on various protected computing resources or services. In some aspects, a credential exchange service may receive an access token from one of various identity providers, such as an Open Authorization (OAuth) access token. The credential exchange service may, using the authenticated identify of a user, determine a set of attributes of the user and/or the resource, and attach them as tags to the access token. In some cases, the tags can be attributes of the user/resource, allowed actions for the user with respect to the resource, and/or pointers of different policies for the user and resource combination. For example: if user A has attributes X, Y and Z belonging to an account, then the tags can indicate attributes X, Y and Z and also indicate pointers for the access policy or policies which dictate the actions that a user having attributes X, Y, and Z can perform on the given resource. In some cases, the tags may be encoded and attached to an identifier of the user to form a temporary set of credentials or session token. In some cases, the identifier may be a unique identifier of the user with respect to an account associated with the protected resource. In other cases, the identifier of the user may be from the identity provider/access token issued by the identity provider. In various aspects, the tags and/or user identifier may be generated and/or encoded to produce a session token that is equal to or less than a threshold size, to enable use with existing systems and internet browsers, for example.

In various examples, the session token may be returned to the user. The user may then request to access (e.g., perform an action with respect to) the protected resource or service. Upon receiving the request and the session token, either the credential exchange service or another service, such as an authorization proxy, and the end resource or service may obtain the set of user attributes and/or fetch the access policies indicated in the session token, and based on determining that the attributes satisfy the one or more access policies, authorize the requested action to be performed with respect to the end resource or service. In various cases, the end services or resources may be provided by a computing resource service provider (service provider). The user may be identified has having an account with the service provider, and the attributes of the user may be determined based on one or more roles that are assigned to the user in the account of the service provider.

In various examples, the session token may be encrypted to increase data security and reduce the likelihood of various attacks to attempt to gain access to protected resources and services. In many cases, the token may be contained in a request header, sent as a bearer token to the end service or resource. In these cases, an attacker would be able to intercept a request and modify the request parameters to gain access to another resource which might not be intended. In response to this problem, an authorization proxy may be used to authorize requests sent to the end service or resource. To further increase security, the session token and a request to access to end resource or service may be decrypted by the authorization proxy (on its way to the end service or resource) and then signed using a series of hashes. Upon receiving the signed session token, the end service may then utilize the same hashing mechanism to reconstruct the session token and request. In this way, vulnerabilities of the protected resource being accessed by an unintended actor may be further reduced.

In some aspects, in addition to one or more access policies that are linked to a user identity, one or more resource specific access policies may also be implemented. In these cases, a resource may have its own access policy that specifies certain attributes of a user that are necessary to access a resource. In various examples, it may be beneficial to verify that the requirements of a resource access policy are met before granting access to the resource to a user at the resource itself, instead of encoding these additional policy requirements in the session token itself. That is, to encode additional resource specific access requirements into each session token may be overly burdensome and generate large or unwieldy session tokens. The described techniques enable flexibility to associate various access requirements with eh resource itself to further reduce the size of session tokens needed to access these resources. In these cases, the end service or resource may receive the request and session token from a user and compare the attributes of the user in the session token with the requirements for the end service. If the attributes satisfy a minimum set of conditions for the end service or resource, then access may be granted at that point.

In various cases, the described credential exchange service may be utilized to provide access management to an online merchant store interface, where the end services or resources are discrete components in a full online merchant store interface or platform, such as inventory, order, catalog, marketing, etc. A user may be defined as having one or more of various roles in the platform, such as owner, merchant, staff, etc., whereby attributes of the user/allowed actions performed by the user, may be defined by those roles.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) more robust data security by defining more precise access policies via session tokens for users to access protected resources; 2) more efficient utilization of computing resources and a reduction in network bandwidth usage by decreasing the size of session tokens exchanged between services to enable access to protected resources; and (3) other benefits and advantages as will be described and made apparent in the description below.

FIG. 1 illustrates an example 100 of a user/user device 120 interacting with a credential exchange service 112, which may be provided by a computing resource service provider 102. In the illustrated example, the user 120 may interface with an identity provider 104, such as through a webpage or online platform. In some cases, the identity provider 104 may be provided by the computing resource service provider 102. In other cases, the identity provider 104 may be provided by an external service. In either case, the user 120 may submit a request 122 to be authenticated to the identity provider 104, such as by submitting credentials (e.g., a user name and password associated with the identity provider 104). The identity provider 104, may in response, authenticate the user against known credentials, and issue an access token to the user, such as may be communicated back to the user 120 via one or more networks at 122. In some aspects the identity provider 104 accessed by a user 120 may be different based on characteristics of the user 120, such as may be represented broadly by class. As illustrated, identity provider 104 may be for a given role of a user 120, such as account owner of protected service or resource 114-118, whereas identity provider 108 may be used for end customers of a given end protected service or resource 114-118, and identity provider 110 may be used for different applications acting in place of user 120 to gain access to an end protected resource or service 114-118.

In any of the above examples, the identity provider 104 may authenticate the user and issue an access token to the user 120. The user 120 may then interact with a credential exchange service 112, provided by the computing resource service provider 102, to access one or more protected service or resource 114-118, at operation 124. The credential exchange service 112 may confirm the identity of the user based on the access token issued by the identity provider 104, and identify an account associated with the user 120 maintained by the computing resource service provider 102. The credential exchange service 112 may then determine one or more attributes of the account of the user. The attributes may include one or various identifiers of the user/roles of the user with respect to the end resource, permissions and/or allowed actions with respect to certain end protected resources or services 114-118, which may also be provided by the computing resource service provider 102, etc. The credential exchange service 112 may then generate a session token or temporary set of credentials for the user 120, including the set of attributes. In some cases, pointers or identifiers of one or more access polices that set forth access requirements for certain resources relating to the user 120 may also be included in the session token. The session token may include tags indicating the user attributes and/or allowed actions with respect to one or more of end protected services or resources 114-118. In some cases, the session token may be encoded in such a way to reduce the size of the session token, such as to conform to various online browser standards (e.g., 4 kilobytes). The credential exchange service 112 may then return the session token to the user 120. In some cases, the session token may be encrypted prior to being returned to the requesting user 120.

Using the session token, the user 120 may then access or perform one or more actions with respect to protected services and resources 114-118 provided by the computing resource service provider 102, via operation 126. The end protected resource/service 114-118 may obtain the session token, decrypt it as needed, and verify that the attributes/allowed actions encoded in the session token satisfy one or more access requirements in one or more applicable access polices associated with the user 120 and/or the protected resource/service 114-118. In some cases one or more access policies associated with the user may be identified in the session token, such that the protected resource 114-118 can obtain the access policy using the identifier in the session token to verify that the user has permission to access the protected resource/service 114-118. In some cases, a separate access policy or policies may be associated with the resource itself, to enable more precise control over access to the resource. In these cases, the resource access policy may be compared to the user access policy/attributes to determine if a minimum set of requirements are met to authorize the user to access the protected resource/service 114-118.

Figure 2:
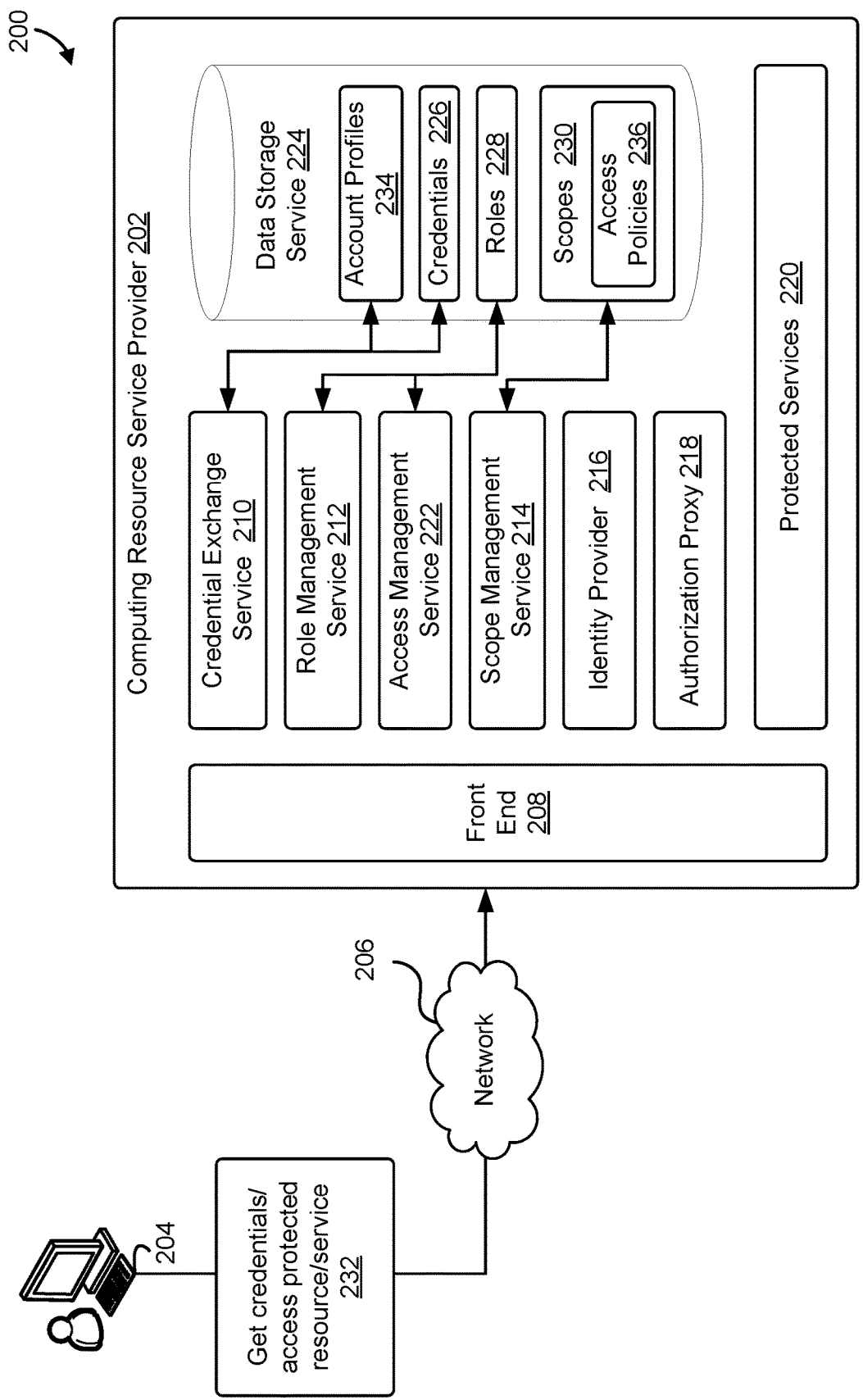
FIG. 2 illustrates an example environment in which the described techniques can be practiced, according to at least one embodiment.

FIG. 2 illustrates an example environment 200 in which a credential exchange service 210 may be provided by a computing resource service provider 202. In various examples, one or more of the identity provider 216, credential exchange service 210, and/or protected resource/service 220 may incorporate or be examples of similarly named components described above in reference to FIG. 1. The credential exchange service 210 may interact with various other computer-implemented services, such as one or more of a front end 208, role management service 212, scope management service 214, identity provider 216, authorization proxy 218, protected services 220, and/or a data storage service 224 to enable more precise access control with respect to protected resources/services 220, as will be described in greater detail below. Various client computing devices 204, may interact with the computing resource service provider 202 through one or more networks 206 to access this functionality.

Client or user 204 may refer to a client computer system or computing device connected to a server (e.g., computing resource service provider) over a network 206. In some cases, client 204 refers to a user or operator of a client computer system and may utilize a computing resource service provider 202 to interact with various forms of data, such as through one or more of a credential exchange service 210, a front end 208, role management service 212, scope management service 214, identity provider 216, authorization proxy 218, identity and access management service 222, protected services 220, and/or a data storage service 224. In various cases, the user 204 may interact with the computing resource service provider 202 to get credentials for accessing protected resources or services 220, such as through various requests/interactions 232.

In some cases, the front end 208 may receive the request(s) 232 and direct it to the appropriate service. The front end 208 may be a system including a set of web servers (e.g., a single web server or a set of web servers which may be managed by a load balancer) provided by the computing resource service provider 202. Web servers of the front end 208 may be configured to receive various requests and data and to process them according to one or more policies associated with the service. In some examples, device 204 may use client software that is configured to establish a client-server relationship with a service of a computing resource service provider 202. A client 204 may connect to a service via front end 208, which receives requests from clients and routes them to backend services. Front end 208 may interface with one or more of a credential exchange service 210, a front end 208, role management service 212, scope management service 214, identity provider 216, authorization proxy 218, identity and access management service 222, protected services 220, and/or a data storage service 224, and/or other services offered by a computing resource service provider 202 to its customers. In at least one embodiment, client 204 interacts with a GUI to interact with various data provided by or through the computing resource service provider 202, and client-side software translates the GUI setup to a web service API request which is transmitted from the client computer system 204 to front end 208 via a network 206. In an embodiment, the network 206 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 206 is enabled by wired and/or wireless connections and combinations thereof. In some cases, a network may include or refer specifically to a telephone network such as a public switched telephone network or plain old telephone service (POTS).

The computing resource service provider 202 may provide various services such as data processing, data storage, software applications, security, encryption, and/or other such services. A computing resource service provider 202 described herein may be implemented using techniques described below in reference to FIG. 9. The computing resource service provider 202 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 202 may provide data storage through a data storage service 224 to store and manage large volumes of data, including text, image, and other data. The data storage service 224 may store various data, such as may be used by the credential exchange service 210, authorization proxy 218, and/or protected services 220 to manage access to protected services 220. In some aspects, data storage service 224 may store credential 226, which may include session tokens/temporary credentials issued by the credential exchange service 226, as will be described in greater detail below. Credentials 226 may include various formats/data structures, and may include user identifiers, tags indicating attributes, tags indicated allowed actions with respect to a protected resource or service, pointers to one or more access policies, and various other data, as will be described in greater detail below. In some aspects, data storage service 224 may store roles 228, which may include data structures that sore attributes and allowed actions organized by an account identifier. In some cases, example roles 228 may include account owner, staff, developer, or customer, for example, each with a different set of allowed actions and each associated with one or more user identifiers of users that are assigned to that role. In some aspects, data storage service 224 may store scopes 230, which may be data structures that include indicators of any of number of different actions that can be performed on a resource or with a service, such as read, write, move, etc., with respect to different data stored or accessed by a resource of service. In some aspects, data storage service 224 may store account profiles 234, which may be data structures that include one or more user identifiers that are associated with and one or more allowed actions or roles for one or more resources or services. In some cases, an account profile my include a user identifier and associated indicator of associated roles and scopes that a given account is associated with/can perform. In yet some aspects, data storage service 224 may store access polices, which may be data structures that include one or more attributes that if satisfied, enable access or permission to perform one or more actions with respect to a protected resource or service 220.

Data storage service 224 may be an on-demand data storage service, such as an object-based data storage service that services API requests to store and retrieve data objects synchronously, and may be configured to store various forms of data and media, and other data structures generated and updated by the credential exchange service 210, role management service 212, scope management service 214, identity provider 216, authorization proxy 218, and/or protected services 220. The data storage service 224 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 224, may be organized into data objects, in one or more logical data containers. The data storage service 224 may include one or more data objects, which may have arbitrary sizes and may, in some instances, have constraints on size. Thus, the data storage service 224 may store numerous data objects of varying sizes. The data storage service 224 may operate as a key value store that associates data objects with identifiers of the data objects which may be used by the various services of computing resource services provider 102 to retrieve or perform other operations in connection with the data objects stored by the data storage service 224. Access to the object-based data storage service 224 may be through application programming interface (API) calls to the service or via an interface, such as a graphical user interface (GUI). Access to the data storage service 224 may be through application programming interface (API) calls to the service, for example from client device 204 directly or through the computing resource service provider 202 and/or front end 208.

It should be appreciated that the data storage service 224 may additionally or alternatively provide non-object based data storage, such as block data storage, table-oriented data storage, relational databases, file-based storage, and the like. The data storage service 224 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost-effective storage class that may provide access with some delay, different redundancy, or other attributes.

The computing resource service provider 202 may provide a credential exchange service 210. The credential exchange service 210 may be a collection of computing resources, including physical resources, virtual resources, or combinations thereof, configured to obtain, authenticate, and generate session tokens for use with various protected resources and service 220. In some examples, the credential exchange service 210 may generate a session token for a user 204 based on an access token or other credential that authenticates an identity of the user 204, such as my be provided by an identity provider 216. The credential exchange service 210 may access various data, such as from data storage service, to identify an account associated with a user (e.g., based on an access token submitted by the user 204), such as an account profile 234. The credential exchange service 210, in some examples, using the account profile 234 of the user, may access one or more roles 228 and/or scopes 230 to determine a set of attributes of the user. In some cases, the set of attributes may include or indicate a set of allowable actions for the user based on one or more roles associated with the user and/or one or more scopes of a given role. The credential exchange service may then generate a set of tags that indicate the set of attributes/allowable actions of the user with respect to one or more protected resources/services 220 and attach them to a unique identifier of the user with respect to the account profile 234/protected resources 220 to generate a session token.

In some cases, the credential exchange service 210 may also access one or more access policies 236 related to the user and/or desired resource/service(s) the user seeks to access. In some cases, the credential exchange service 210 may generate and attach one or more pointers or identifiers of the relevant access policies 236 to the session token. In various examples, the credential exchange service 210 may encode the tags/pointers in a way to reduce the size of the session token to be at or below a threshold size. In this way, the session token may be easily and efficiently communicated to different actors/services, and may be usable by various web browsers and online platforms that have maximum size thresholds for session tokens. In some cases, access polices 236 may be defined within or part of one or more scopes 230.

The computing resource service provider 202 may also provide a role management service 212. The role management service 212 may be a collection of computing resources, including physical resources, virtual resources, or combinations thereof, configured to manage roles for different users and store associations between user identifiers, protected services/resources and allowable actions performable by different users with respect to the protected resources/services 220. The role management service 212 may access, modify, and/or store roles 2228 with a data storage service 224. In some cases, the credential exchange service may interface with the role management service 212 to determine one or more roles associated with the identity of a user/account.

The computing resource service provider 202 may provide a scope management service 214. The scope management service 214 may be a collection of computing resources, including physical resources, virtual resources, or combinations thereof, configured to manage different scopes for various roles and users of protected resources/services 220. In some aspects, the scope management service 214 my interface with role management service 212 to define what actions can be performed by what users or accounts with respect to individual protected resources/services 220.

The computing resource service provider 202 may provide an access management service 222. The access management service 222 may be a collection of computing resources, including physical resources, virtual resources, or combinations thereof, configured to manage different access policies, scopes, and roles for various entities interacting with the computing resource service provider 202. In some aspects, the access management service 222 may interface with the scope management service 214 and the role management service 212 to define what actions can be performed by what users or accounts with respect to individual protected resources/services 220.

The computing resource service provider 202 may, in some cases, provide an identity provider 216. Identity provider 216 may be a collection of computing resources, including physical resources, virtual resources, or combinations thereof, configured to authenticate an identity of a user or application (generally referred to herein as an entity). In some cases, the identity provider 216 may authenticate the identity of a user based on credentials provided by the user (e.g., username password, secret, etc.). The identity provider 216 may then generate a unique digital identifier of the user. In various cases, the identity provider 216 may be provided by an external service, such as may not be associated with the computing resource service provider 202. In various cases, the identity provider may provide an identity of the user that is suable by other services, and indicates authenticity of the user, such as to a credential exchange service 210.

The computing resource service provider 202 may provide an authorization proxy 218. The authorization proxy 218 may be a collection of computing resources, including physical resources, virtual resources, or combinations thereof, configured to obtain and decrypt, in some cases, a session token provided by a user, to identify/determine a set of attributes to be used to authorize a user to perform one or more actions with respect to a protected service/resource 220. In some cases, the authorization proxy may be an intermediary between a user and a protected service 220. In some cases, as will be described in greater detail below, authorization proxy 218 may decrypt and then add some security layer on top of the session token, such as by signing the session token and r/or the request from the user to access service 220, to provide an additional layer of security around accessing the service 220, prior to communicating the session token to the protected service 220. In some cases, the authorization proxy 218 may perform the authorization process, whereby one or more access policies are compared to the session token to determine if the user is authorized to perform one or more requests actions with respect to the service 220.

The computing resource service provider 202 may provide protected services 220. The protected services 220 may be a collection of computing resources, including physical resources, virtual resources, or combinations thereof, configured to perform various functions, generate, modify, and store data, etc., on behalf of a user. More detailed examples of end service or resources 220 may described in reference to FIGS. 3 and 4 below. In some cases, a protected service 220 may compare a session token, supplied from a user, such as through authorization proxy 218, to one or more access policies to determine if a given action is permitted or not for a given service/resource. It should be appreciated that the techniques described herein have a broad range of applications, and that the above-mentioned use cases are only given by way of example.

Figure 3:
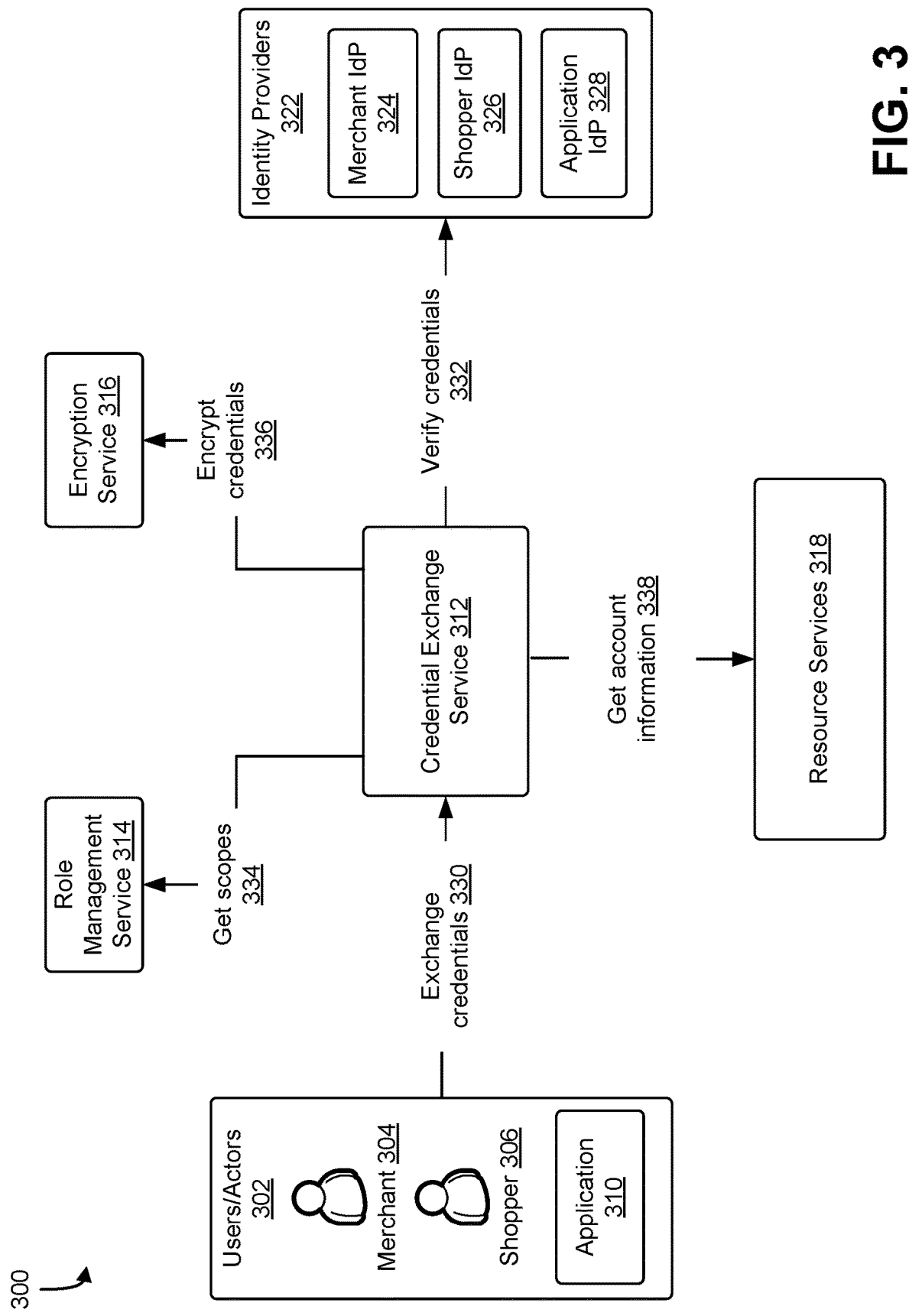
FIG. 3 illustrates another example of a credential exchange service, according to at least one embodiment.

FIG. 3 illustrates another example of a credential exchange service 312, which may be an example of and/or include one or more aspects of credential exchange service 112, 210 described above in reference to FIGS. 1 and 2. In various examples, one or more of the identity provider 322, and/or role management service 314 may incorporate or be examples of similarly named components described above in reference to FIGS. 1 and 2, respectively. In the example of environment 300, the end service or resource a user is attempting to access may be an online store application or service.

As illustrated, the credential exchange service 312 may interact with various different users or actors 302, such as merchant 304 (service or account owners), shoppers 306 or service users that are registered or have an account with a protected service (e.g., have a business account associated with the end service or resource), guests (not illustrated) (e.g., unregistered users of customers), or other applications 310. In various examples, the user may send credentials generated by a third party, such as an identity provider to be exchanged by the credential exchange service 312 at operation 330.

Upon receiving credentials from a user at 330, the credential exchange service 312 may then verify or introspect the credentials at operation 332, by sending the credentials to an appropriate identity provider 322, such as a merchant identity provider 324 in the case the request is originated by a merchant 304, a shopper identity provider 326 in the case that the request originates from a shopper/customer 306, or an application IdP 328 in the case the request originates from ana application 310. In some cases, the identity provider 322 may verify the identity of the actor 302. In some cases, this may include confirming that a given user identifier associated with a business account/role of the resource or service provider matches an authenticated identity of the actor 302.

The credential exchange service 312, using the verified identity of the user/account, may then obtain role information for the account and get any scopes or allowed actions associated with any roles of the account, at operation 334, by communicating with the role management service 314. In some cases, the credential exchange service 312 may communicate with resource services 318 to get information about the account and/or resource, such as a list of top level resources associated with the service the actor is requesting to access, at operation 338. In some cases, the credential exchange service 312 may also obtain account status and account information, at operation 338. In some cases, the business status may indicate whether a given account is active, suspended (e.g., for an investigation for fraud), inactive, or closed. The account information may indicate which stores or resources the account is associated with. In some aspects, the list of top level resources may then be used to determine what scopes are applicable to obtain from the role management service 314.

Once all of this information has been obtained, the credential exchange service 312 may generate a set of tags and attach those tags to the credentials provided by the identity provider 322/user 302 to generate a session token/temporary credentials. In other cases, the credential exchange service 312 may use other information, such as an account ID for the actor, a secret associated with the actor, and various other information to generate the session token. Once the session token has been generated, the credential exchange service 312 may then have the credentials/session token encrypted at operation 336 by an encryption service 316. The credential exchange service 312 may the return the encrypted credential back to the user 302.

As used herein, a merchant user may be associated with multiple end services or stores (in the example of environment 300) and/or multiple accounts. A role or business role may be associated to a user and gives that user permissions to perform actions on resources owned by an instance. Further, business roles can be either global or custom roles. A global role is not tied to any service (e.g., store) and can be used for role associations across services (e.g., across stores). A custom role is bounded to a particular service or resource (e.g., store), and can only be used for role associations for the employees/agents of the service (e.g., store).

A role association may correspond to business role associations. Individuals can be associated with multiple business role to perform certain actions on allowed resources. For example: Sam's Custom Role in Store A. Role associations are bound to an identity, resource group (Store, Namespace/Business Account/Individual resources] and a business role. For example: Jane can be a Admin of Store A. In various examples, allowable actions for a business owner may include creating an account, create/delete resources/services (e.g., stores), manage billing and other services, etc., and manage store specific operators (e.g., view inventory, create catalog).

In some aspects, the credential exchange service may generate and provide different types of credentials based on the role of a particular user. These credentials may include a global credential that can access services/resources of the instance/account (e.g., permission to call top level APIs to create account and view account information such as roles; a business account credential that grants permission to create services, get creation status, and get services associated with an account; and a service (e.g., store) credential that are given to shoppers when they enter service and enable limited functionality, such as modifying payments, orders, etc.)

Figure 4:
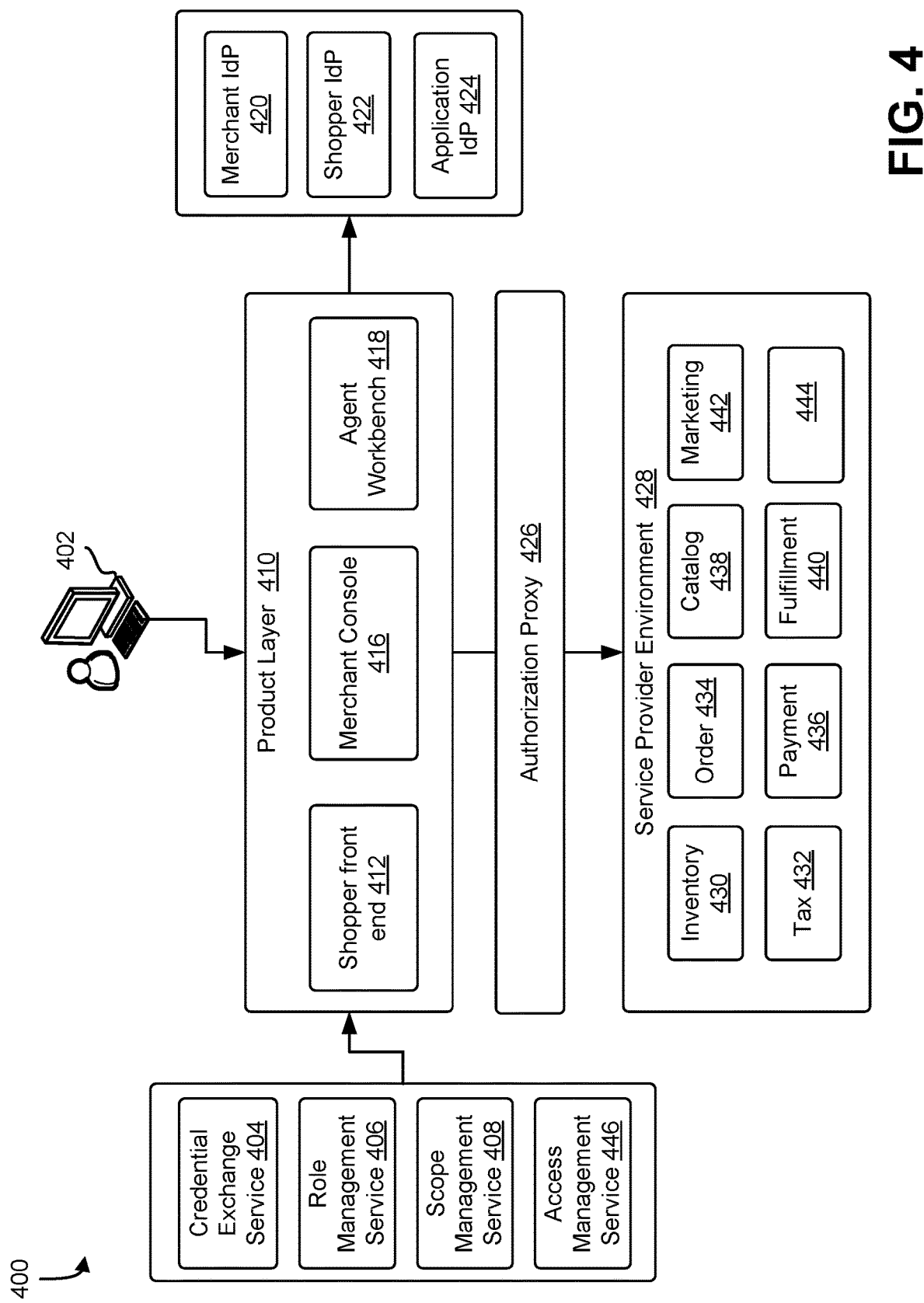
FIG. 4 illustrates another example of a credential exchange service, according to at least one embodiment.

FIG. 4 illustrates another example implementation of a credential exchange service 404, which may be an example of and/or include one or more aspects of credential exchange service 112, 210, 312 described above in reference to FIGS. 1-3. In various examples, one or more of the identity providers 420, 422, 424, role management service 406, scope management service 408, an authorization proxy 426 may incorporate or be examples of similarly named components described above in reference to FIG. 1, 2, and or 3, respectively. In the example of environment 400, the end service or resource a user is attempting to access may be one or a number of discrete services or resources relating to providing an online store service or venue provider.

In some cases, the user 402 may access these various services through a product layer 410, which may include various graphical user interfaces, such as web interfaces, that provide various features, such as a shopper front end 412 that includes interfaces for accessing, modifying, and presenting various products and services for consumption on a publicly accessible online forum. In some cases, the product layer 410 may also include merchant console 416, which may provide for various interfaces for a merchant to interact and configure a storefront 412. In some cases, the product layer 410 may also include an agent workbench 418, which may provide for one or more interfaces for external agents to interact with various other services provided by or through the product layer 410.

A user may interact with one or more services provided by product layer 410. In some cases, a service of product layer 410, or a user through these services, may attempt to access a protected or restricted resource or service, such as provided by a services provider environment 428, including, in the online store context, various services, such as inventory 430, tax 432, order 434, payment 436, catalog 438, fulfillment 440, marketing 442, and various other services 444. In order to access these services, the user may acquire an access token via an identity provider such as a merchant IdP 420, a shopper IdP 422, or an application IdP 424. The user 402/service of product layer 410 may then interact with the credential exchange service 404, role management service 406, scope management service 408, and/or access management service 446 to translate the access token generated by the identity provider to a session token that can be utilized by the authorization proxy 426 and/or one or more of services 430-444 in the service provider environment to enable the user to access these services. Upon receiving the session token, the authorization proxy 426 may decrypt the session token, if needed, and compare the user attributes/allowed actions to one or more access policies related to the service provider environment 428. Upon confirming that the user attributes/allowed actions satisfy requirements of the access policies, the authorization proxy may grant the user access to one or more services 430-444.

Figure 5:
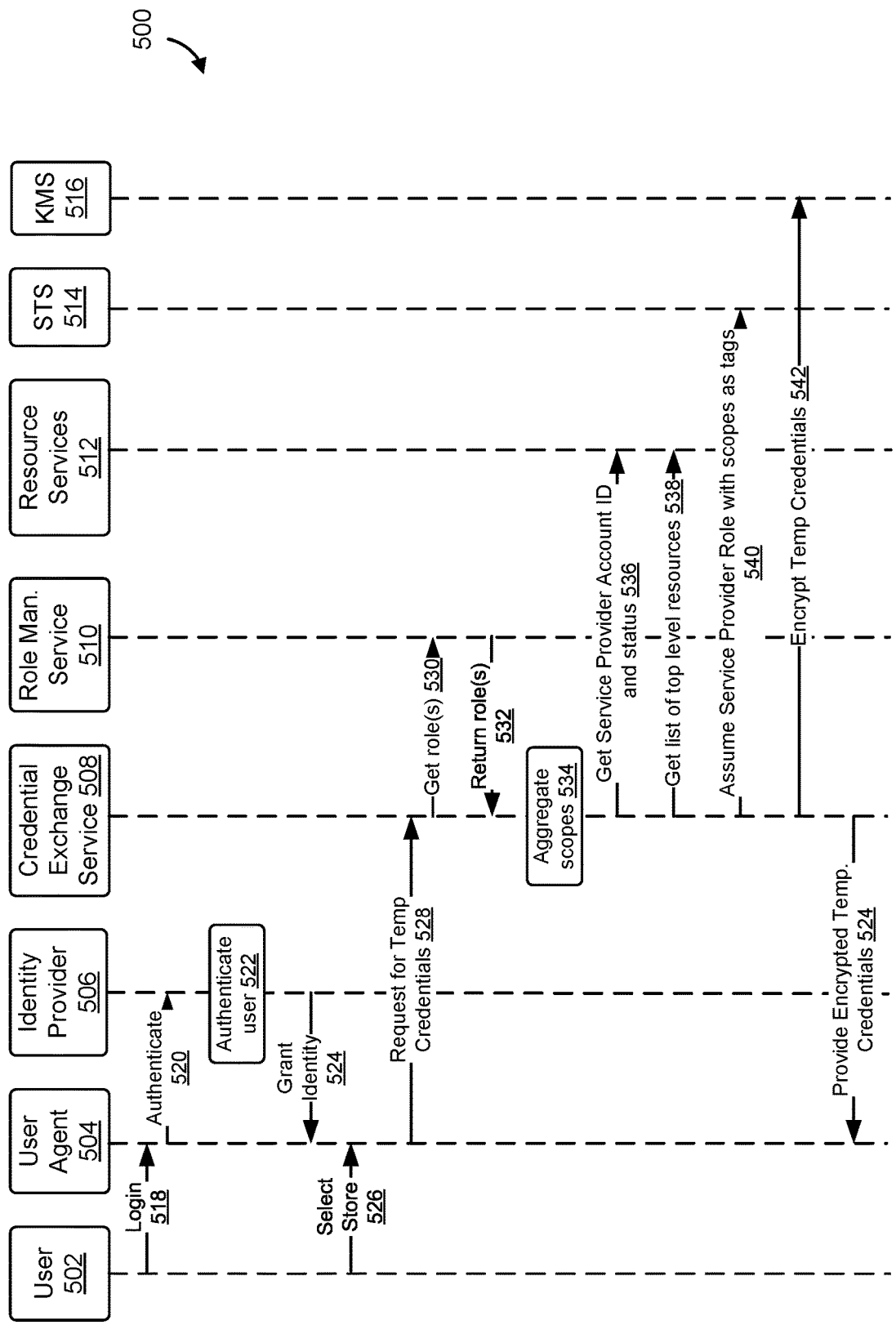
FIG. 5 illustrates example communications between a credential exchange service and other services to generate a session token, according to at least one embodiment.

FIG. 5 illustrates example communications 500 between a credential exchange service and other services to generate a session token. Credential exchange service 508 may be an example of or include one or more aspects of credential exchange service 112, 210, 312, and/or 404, described above. Similarly, other components illustrated in FIG. 5 may share one or more aspects of similarly named components described throughout this disclosure.

As illustrated in FIG. 5, a user 502 may login 518 (e.g., provide login credentials) to a user agent 504, such as may be provided by or through a web interface/internet browser. The user agent 504 may provide the credentials to an identity provider 506 at 520, which may authenticate the user at operation 522, and grant an identity for the user, returning the digital identity to the user agent 504 at 524. In some aspects, the user 502 may then select a resource or service to access, such as a store, at operation 526. In response, the user agent 504 may then send a request for temporary credentials (e.g., a session token) at operation 528 to credential exchange service 508.

The credential exchange service may then determine one or more attributes/allowed actions for the user, such as in one example, as exemplified by operations 530-534. In some cases, the credential exchange service 508 may get roles of the user/associated with an account of the user at operation 530 by sending a request to a role management service 510. Upon receiving the roles via operation 532, the credential exchange service 508 may aggregate all the scopes 534 (e.g., allowed actions) for the user from the roles associated with the given resource (e.g., store). The credential exchange service 508 may then obtain a service provider account ID and a status indicator for the user, at operation 536 from resource services 512, which may manage account information for the various end resources/services provided by the service provider. The credential exchange service 508 may also, in some cases, obtain a list of the top level resources for the given resource (e.g., store) from resource services 512 at operation 538, which may indicate all of the resources needed to perform available actions with respect to the store. The credential exchange service 508 may then assume the service provider role with scopes as tags 540, through a secure token service 514. Assuming the service provider role may include sending a request to the secure token service to generate a session token with the appropriate tags. The credential exchange service 508 may then request that the temporary credentials or session token provided by the secure token service 514, be encrypted 542, such as by a key management service 516. Upon obtaining the encrypted credentials, the credential exchange service 508 may return the encrypted credentials to the user agent 504, to be used by the user to access the indicated store/resource.

Figure 6:
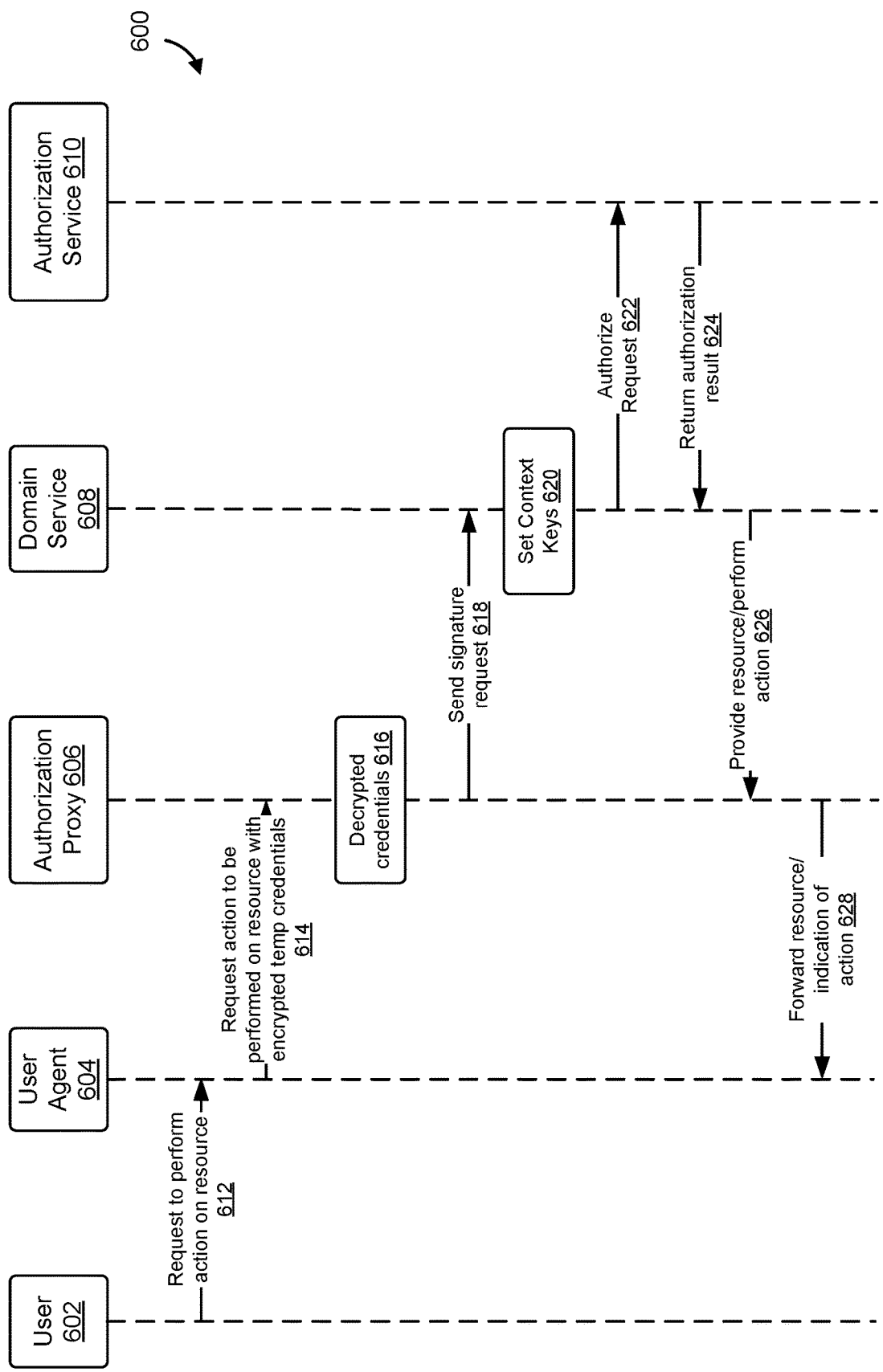
FIG. 6 illustrates example communications between a user and an authentication proxy to authorize actions to be performed on a protected resource using a session token, according to at least one embodiment.

FIG. 6 illustrates example communications 600 between a user 602 and an authentication proxy to authorize actions to be performed on a protected resource. Authorization proxy 606 may be an example of or include one or more aspects of authorization proxy 218, 426 described above. Similarly, other components illustrated in FIG. 6 may share one or more aspects of similarly named components described throughout this disclosure. Upon obtaining a session token/temporary credentials form a credential exchange service, such as illustrated via communications and process 500 above, the user may request to perform an action on a resource (e.g., store), at operation 612, through a user agent 604. Upon receiving the request, the user agent may pass the request and the session token to an authorization proxy 606 at operation 614.

The authorization proxy 606 may decrypt the session token/credentials, at operation 616, and send a request to have the decrypted credentials signed, at operation 618 to a domain service 608. In some examples, the domain service 608 may set one or more context keys 620 for the credentials, and send a request to authorize the requested action at operation 622 to an authorization service 610 associated with the provider of the end resource. If the credentials satisfy an access policy associated with the resource, the authorization service may authorize the request, at operation 624. The domain service 608 may then provide the resource/perform the requested action, at operation 616 and indicate the same through the authorization proxy 606 to the user agent 604 at operation 628.

Figure 7:
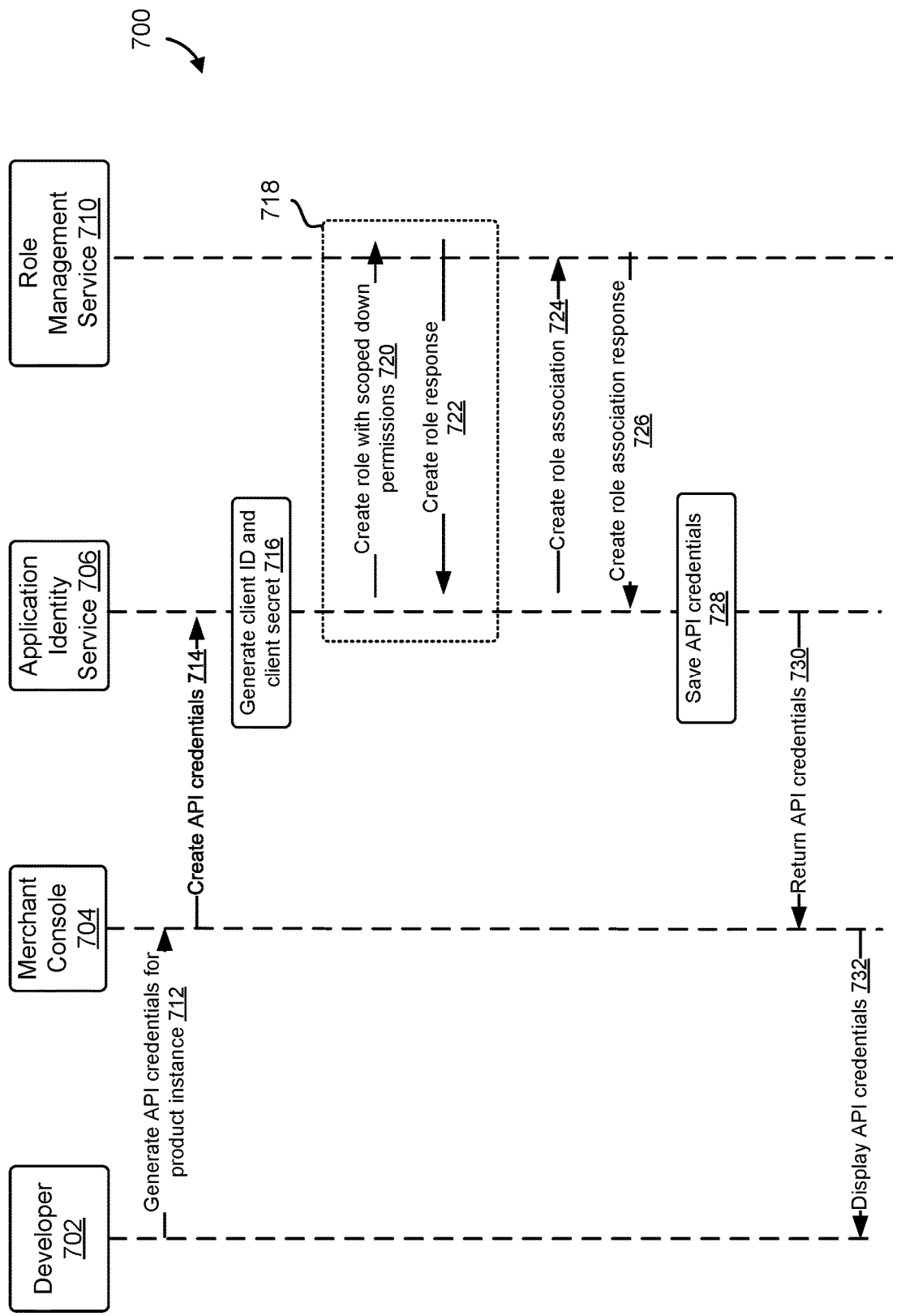
FIG. 7 illustrates example communications between a developer and various entities to generate API credentials, according to at least one embodiment.

FIG. 7 illustrates example communications 700 between a user/developer 702 and various entities to generate API credentials for an application, as an initial step for generating an access token for an application. As illustrated, role management service 710 may be an example of or include one or more aspects of role management service 212, 314, 406 and/or 510 described above. Similarly, other components illustrated in FIG. 7 may share one or more aspects of similarly named components described throughout this disclosure.

As illustrated, a developer 702 (e.g., a type of user associated with an application) may create API Credentials via merchant console 704, at operation 712. Merchant console 704 may be an example of or include one or more aspects of merchant console 416 described above. Developer 702 may provide an identifier of the resource or application (e.g., product ID), a name designation, one or more scopes (e.g., access policies) they would like to grant access, and a grant type. Upon receiving the input parameters for the API credential, the merchant console 704 may then call an application identity service (e.g., an identity provider that is specific to applications rather than users) to create the API credentials, at operation 714. In some cases, the request may contain one or more of the following parameters: Target ID: resource or product ID of the developer; Name: Name provided by the developer; Description: description provided by the developer; and Scopes: list of scopes (permission) selected by the developer. This is an optional parameter. If no scopes are provided (e.g., value is null), then the API credentials may be given have full access. The application identity service 706 may then generate credentials with following information: Client ID: A unique Client ID, and Client Secret: secret of the API Credentials, at operation 716. This information may be used later to obtain an access token that can be used to call various APIs.

In some cases, as represented by optional dashed box 718, if the request contains list of scopes, then the application identity service 706 may create a new custom role with the role management service 710 with the provided scopes, at operations 720. This role will be used in later steps to configure API Credentials' permission on developer's applications. In some cases, to avoid the confused deputy problem, the application identity service 706 may validate that the credential creator has all the permissions on the product instance that they are requesting for the API credentials. The application identity service 706 may then receive a role Id in the response for the newly created custom role, at operation 722.

The application identity service 706 may then create a business role association to configure API credentials' permissions on the developer's application, at operation 724. In some cases, if scopes are provided in the request, then application identity service 706 will use the custom role ID previously generated. Otherwise, it will use a pre-defined role that has all the scopes to configure API credentials' permission on the application.

The application identity service 706 may then receive a response from role management service 710 indicating the API credentials' permissions were successfully configured on the application, at operation 726. The application identity service 706 may then persist the API credentials, such as in a database or datastore, at operation 728. The application identity service 706 may return the API credentials to the merchant console 704 at operation 730, whereby the merchant console 704 may display the API credentials to the developer 702, at operation 732. In some cases, the developer 702 can only access the client secret when the API credentials are created.

Figure 8:
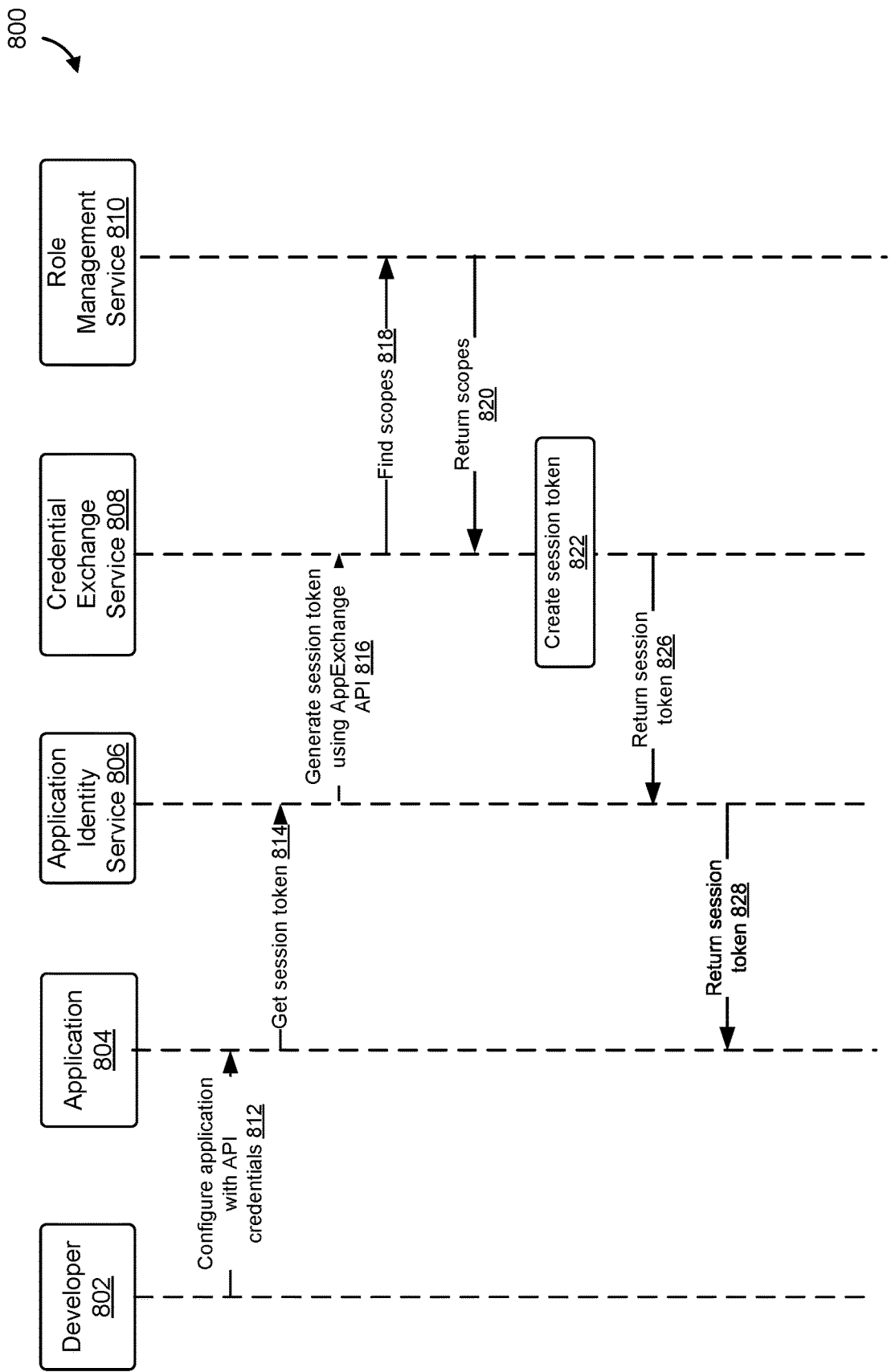
FIG. 8 illustrates example communications between a developer and a credential exchange service to generate a session token using API credentials, according to at least one embodiment.

FIG. 8 illustrates example communications between a developer 802 and various services, including a credential exchange service 808 to generate a session token using API credentials. In some aspects, process 800 may be performed after or using the API credential generated by process 700 described above. As illustrated, credential exchange service 808 may be an example of or include one or more aspects of credential exchange service 112, 210, 312, 404, and/or 508 described above. Similarly, other components illustrated in FIG. 8 may share one or more aspects of similarly named components described throughout this disclosure.

As illustrated, a developer user 802 may configure an application 804 with API credentials, such as the API credentials generated/obtained via process 700 described above, at operation 812. The application may, in response, call the application identity service 806 to get a session token using the API Credentials, at operation 814. In the request, the application may provide one or more of the following attributes or parameters: client ID: such as a unique Client ID; and a client secret: secret of the API credentials. The application identity service 806 may then validate the client ID, and client secret, and upon validation, may call the credential exchange service 808 to create a session token (or set of temporary credentials), at operation 816.

The credential exchange service 808 may then call the role management service 810 to get list of scopes that are configured for the API credentials, at operation 818. In some examples, this may be performed by looking up role association resource and then querying scopes based on the role ID. In some cases, the credential exchange service 808 may validate resource status from resource services and get resource specific metadata to be added as tags. The role management service 810 may subsequently respond with the list of scopes, at operation 820. The credential exchange service 808 may create a new session token, at operation 822. The session token may be provided to the application to call various APIs. In some cases, the session token may expire after a duration of time, (e.g., 5 minutes, 10 minutes, 15 minutes, or any other configurable value). The credential exchange service 808 may return the session tokens to the application through the application identity service, at operations 826 and 828. In some aspects, the session token may include the following information: Session token: token that will be used to call different APIs; and Session token Expiration: expiration timestamp for the session token.

Figure 9:
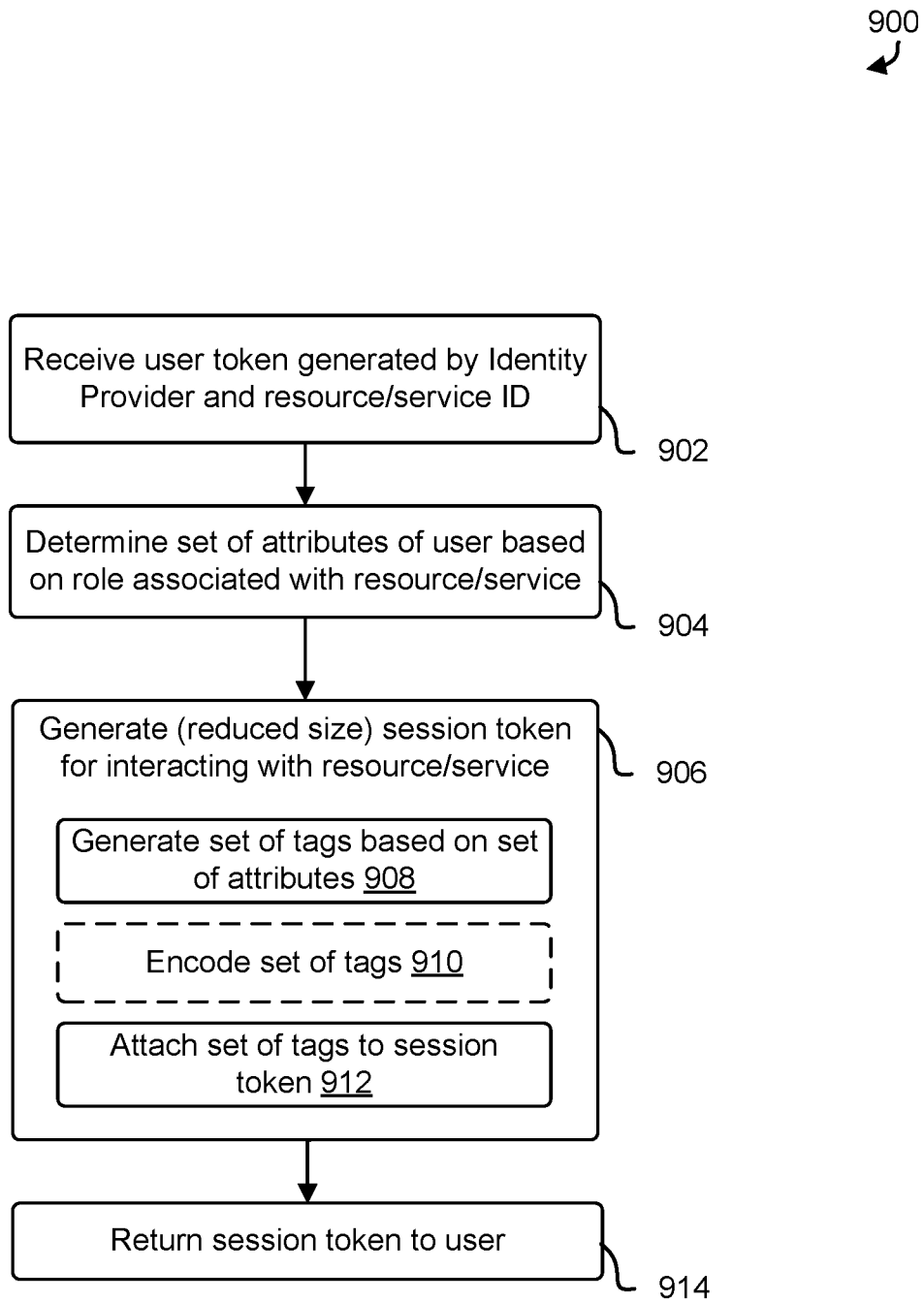
FIG. 9 illustrate an example process for generating a session token, according to at least one embodiment.

FIG. 9 illustrate an example process 900 for generating a session token, such as may be performed by a credential exchange service 112, 210, 312, 404, 508, and/or 808 described above. In some aspects, process 900 may include one or more operations or communications described above in reference to FIGS. 5 and/or 8.

Process 900 may begin at operation 902, in which a user token (or application token, such as an API credential generated via process/communications 700 described above) generated by an identity provider and a resource/service identifier may be received, such as by a credential exchange service, via a request to access the resource or service. At operation 904 the credential exchange service may then determine a set of attributes of the user/application based on the user account associated with the resource, such as via the techniques described in greater detail above.

The credential exchange service may then generate a session token or temporary credential for interacting with the resource or service using the set of attributes, at operation 906. In some cases, operation 906 may further including generating a set of tags based on the set of attributes of the user/application and/or resource at operation 908. In some optional cases, generating the session may also include encoding the set of tags, at operation 910, for example, to reduce the resulting size of the session token. The set of tags may then be attached or associated with the session token, at operation 912. In some cases, operation 912 may including attaching the set of tags to the client secret to form the session token. The session token may then be returned to the user, at operation 914.

In some cases, encoding the set of tags may include one or more of the following operations. It should be appreciated that the steps described below are only given by way of example, and that various other techniques may be used to a similar effect. In some cases, the set of tags may include encoding scopes, described above, to generate scope identifiers or scopeIds. These scopeIds may be used in the authorization policy conditions in the policy statement present with the session token.

In some cases, scopeIds may be incremental numbers starting from 000 to 999. In this example, 3 digits are chosen for simplicity, but can be increased to any number of digits to accommodate for new scopes. The scopeIds may then be encoded. The scopeId is modulo divided by the maximum scopes per tag (e.g., 50). Let this value be called A. The encoded scopeId may be the value of A in a Base62 table. Let this value be called as B. The tag key may then be computed, where the tag key contains a prefix as well as a tag number. The tag number may be calculated by dividing the scopeId by the ScopesPerTag (e.g., 50 as per IAM Limits). The encoded tag number may be the value of the tag number in the Base62 Table. Now, the tag key may be the concatenation of a hard-coded prefix (aws:PrincipalTag/S) and the encoded tag number. Example: aws:PrincipalTag/SA. The tag value may then be computed. The tag value may contain the value of B (e.g., encoded scopeId) in the format *<B>*. For example: *S*

The tag key and the tag value may then be associated with the IAM StringLike condition—"StringLike", and then returned to the controller to add this as a condition in the policy when assuming the IAM Role. For example: {"StringLike": {"aws:PrincipalTag/SA": "*A*"}}

Encoding may be done in-order to reduce the character size in the token thereby reducing the size of the token which helps in enabling storage of token in size constrained mediums like cookies and also improves efficiency of network transit. This helps to represent the scopes using a single bit characters instead of using the actual scopeId (which might be >3 digits long according to the max scopes which can be supported)

An example of encoded scopeIds is provided below:
"000"→{"StringLike": {"aws:Principal Tag/SA": "*A*"}}
"010"→{"StringLike": {"aws:Principal Tag/SA": "*K*"}}
"050"→{"StringLike": {"aws:PrincipalTag/SB": "*A*"}}
"222"→{"StringLike": {"aws:PrincipalTag/SE": "*W*"}}
"400"→{"StringLike": {"aws:PrincipalTag/SI": "*A*"}}
"99"→{"StringLike": {"aws:Principal Tag/ST": "*"}}

Figure 10:
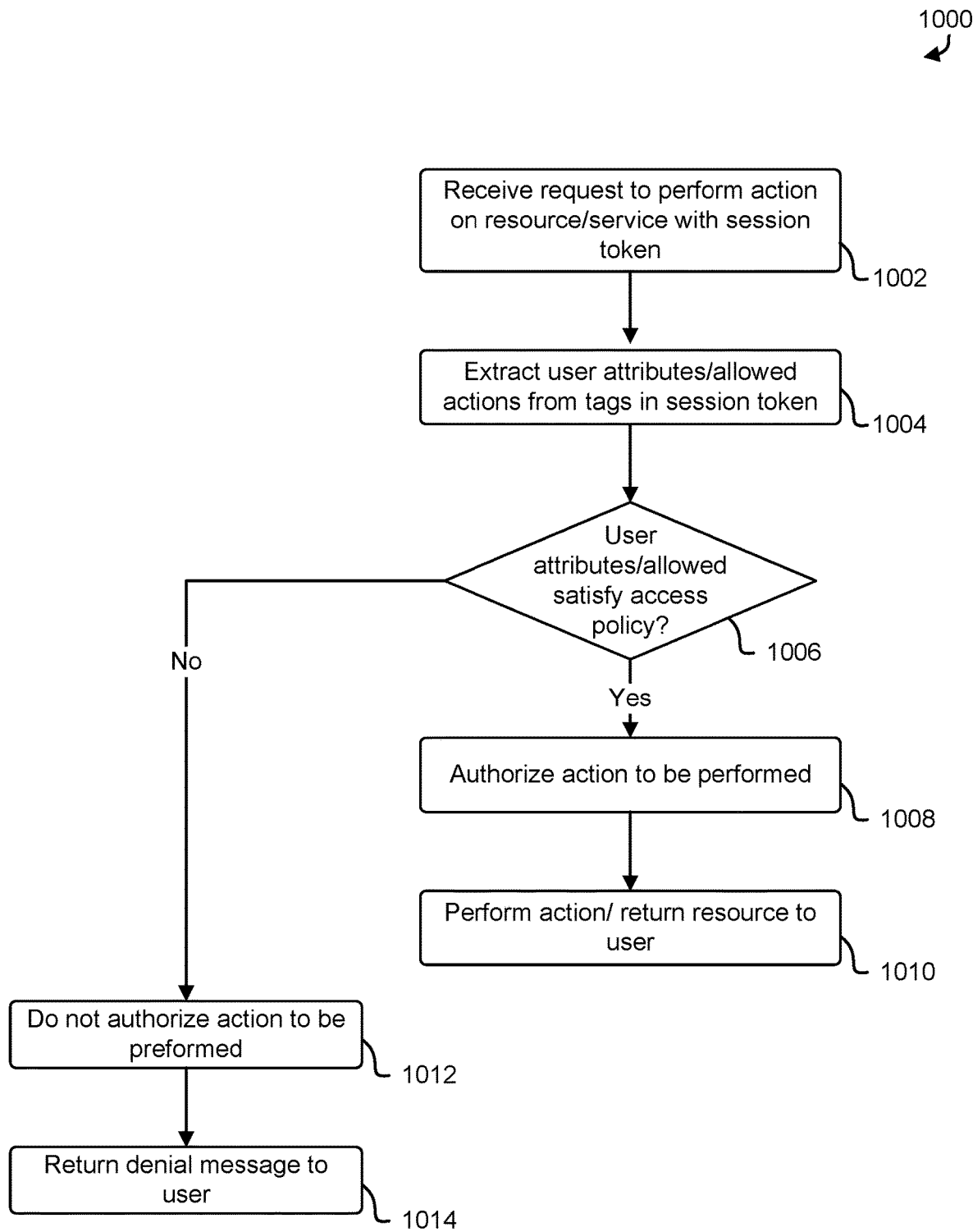
FIG. 10 illustrate an example process for authorizing actions to be performed on a protected resource using a session token, according to at least one embodiment.

FIG. 10 illustrate an example process 1000 for authorizing actions to be performed on a protected resource using a session token, such as may be performed by an authorization proxy 218, 426 and/or 606 and/or end protected service or resource 114-118, 220, 428-444, and/or 608. In some aspects, process 1000 may include one or more operations or communications described above in reference to FIG. 6.

Process 1000 may begin at operation 1002, in which an authorization proxy may receive a request to perform an action on or with respect to a resource or service accompanied by a session token, such as may have been generated via the processes described above. At operation 1004, the authorization proxy may extract the user attributes or allowed actions (or in some cases, identifiers of access polices) from the tags in the session encoding (e.g., decoding the set of tags). The authorization proxy may then compare the allowed actions (e.g., scopes)/access polices from the session token to see if the user has adequate permission to perform the requested action with respect to the resource, at operation 1006. In some cases, operation 1006 may including comparing one or more user access polices with one or more resource access policies, as described in greater detail above.

If the user is not permitted to perform the requested action, then the action may be disallowed/not authorized, at operation 1012, and a denial or error message may be returned to the user, at operation 1014. If the requested action is permitted, then the action may be authorized, at operation 1008, and a response/indication of performance of the requested action, may be returned to the user, at operation 1010.

Figure 11:
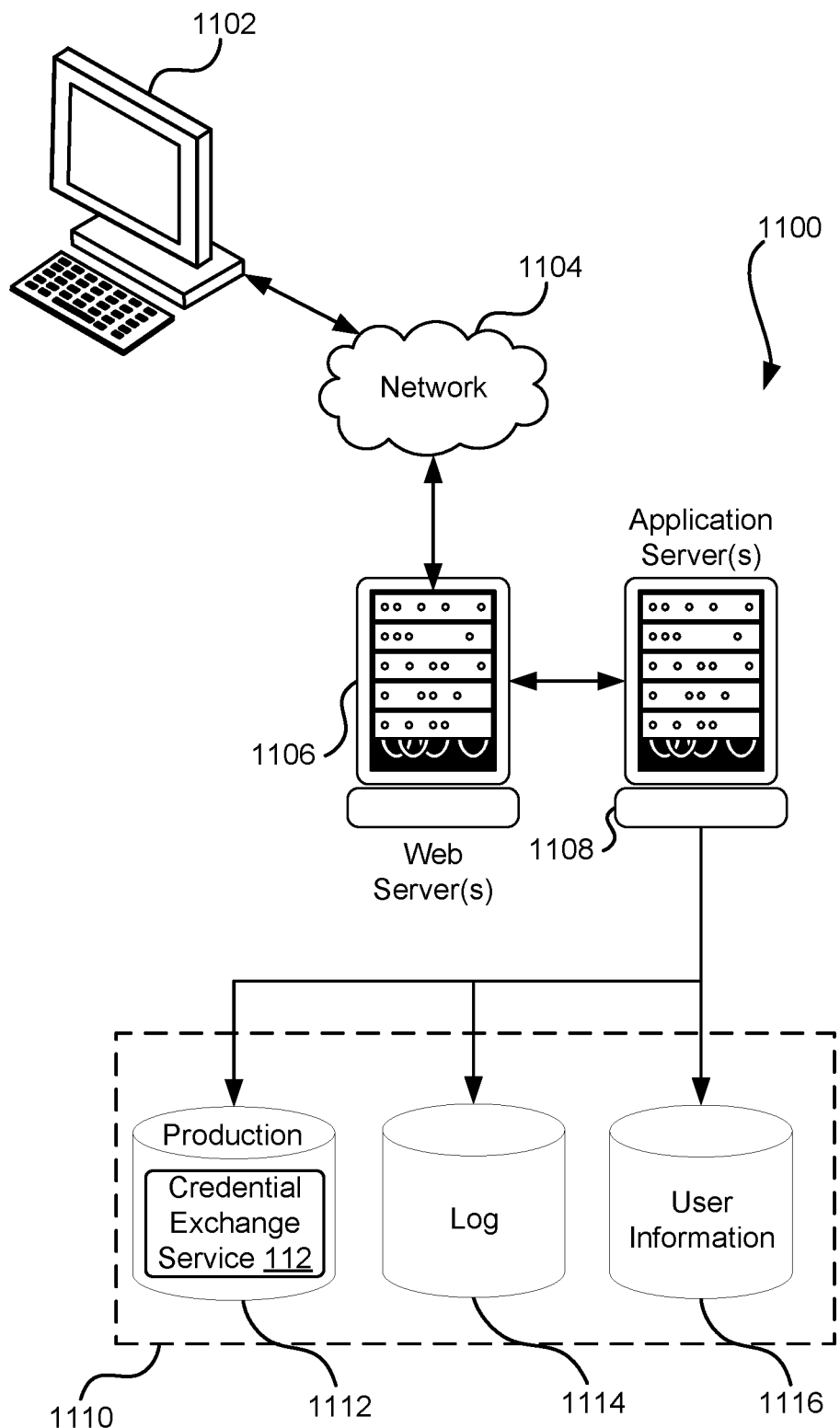
FIG. 11 illustrates a system in which various embodiments can be implemented.

FIG. 11 illustrates aspects of an example system 1100 for implementing aspects in accordance with an embodiment. As will be appreciated, although a web-based system is used for purposes of explanation, different systems may be used, as appropriate, to implement various embodiments. In an embodiment, the system includes an electronic client device 1102, which includes any appropriate device operable to send and/or receive requests, messages, or information over an appropriate network 1104 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1106 for receiving requests and serving content in response thereto, although for other networks an alternative device serving a similar purpose could be used as would be apparent to one of ordinary skill in the art.

In an embodiment, the illustrative system includes at least one application server 1108 and a data store 1110, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 1102 and the application server 1108, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1110, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1112 and user information 1116, which are used to serve content for the production side. The data store also is shown to include a mechanism for storing log data 1114, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1110.

The data store 1110, in an embodiment, is operable, through logic associated therewith, to receive instructions from the application server 1108 and obtain, update or otherwise process data in response thereto, and the application server 1108 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1102. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1100 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1100, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer implemented method comprising:
   receiving, by a credential exchange service provided by a computing resource service provider, a user token generated by an identity provider that provides authentication of an identity of a user and an identity of a protected resource provided by the computing resource service provider;
   determining a set of user attributes associated with an account corresponding to the identity of the user based on the user token;
   determining a set of allowed actions, with respect to the protected resource, for the account corresponding to the identity of the user based on the set of user attributes;
   generating a session token for interacting with the protected resource by:
     generating a set of tags that correspond to and indicate the set of allowed actions for the account;
     encoding the set of tags to produce a set of encoded tags; and
     attaching the set of encoded tags to a user secret associated with the user to form the session token; and
   upon receiving a request to perform a first action on the protected resource and the session token, authenticating, by an authorization proxy, the user to perform the first action on the protected resource by comparing the set of allowed actions from the set of encoded tags from the session token to an access policy associated with the protected resource.

2. The computer-implemented method of claim 1, wherein determining the set of allowed actions for the account comprises determining at least one role assigned to the account with respect to the protected resource, wherein the at least one role comprises at least one permitted action performable with respect to the protected resource, and wherein the computer-implemented method further comprises generating the session token based on the at least one role.

3. The computer-implemented method of claim 1, further comprising: encoding the set of tags to produce the set of encoded tags such that the set of encoded tags attached to the session token do not exceed a threshold size.

4. The computer-implemented method of claim 1, further comprising:
   signing by the authorization proxy, the session token; and
   verifying, by the authorization proxy, that first action is permitted for the account with respect to the resource by at least communicating the signed session token to an authorization service of the computing resource service provide.

5. The computer-implemented method of claim 1, wherein the protected resource comprises a resource specific access policy including a second set of attributes necessary to perform actions with respect to the protected resource, and wherein authenticating the user to perform the first action on the protected resource further comprises comparing the set of attributes associated with the account of the user and the second set of attributes of the resource specific access policy.

6. A system, comprising:
   one or more processors;
   memory that stores computer-executable instructions that, if executed, cause the one or more processors to:
     receive, by a credential exchange resource provided by a computing resource service provider, a user token generated by an identity provider that provides authentication of an identity of a user and an identity of a resource;
     determine a set of attributes of the user based on information indicating the user's association with the resource;
     generate a session token for interacting with the resource by:
       generating a set of tags based on the set of attributes of the user; and
       attaching the set of tags to the session token; and
     upon receiving a request to perform a first action with respect to the resource and the session token, authorize the user to perform the first action by comparing the set of attributes from the set of tags from the session token to an access policy associated with the resource.

7. The system of claim 6, wherein the session token further comprises an indication of the identity of the user and wherein the computer-executable instructions that, if executed, further cause the one or more processors to:
   generating the set of tags such that the session token does not exceed a threshold size.

8. The system of claim 6, wherein the computer-executable instructions that, if executed, further cause the one or more processors to:
   determine a set of allowable actions for the user with respect to the resource, wherein the set of tags comprise the set of allowable actions.

9. The system of claim 8, wherein the computer-executable instructions that, if executed, further cause the one or more processors to:
   determine at least one role associated with the account of the user based on the attributes of the user, wherein the set of allowable actions is determined based on the at least one role.

10. The system of claim 8, wherein the computer-executable instructions that, if executed, further cause the one or more processors to:
    determine the at least one role and a status of the account associated with the account of the user by communicating with an external service.

11. The system of claim 6, wherein the computer-executable instructions that, if executed, further cause the one or more processors to:
sign by an authorization proxy, the session token; and
verify, by the authorization proxy or the resource, that first action is permitted for the user with respect to the resource by at least communicating the signed session token to an authorization service of the computing resource service provide.

12. The system of claim 6, wherein the resource is further associated with a resource specific access policy including a second set of attributes necessary to perform actions with respect to the resource, and wherein authorizing the user to perform the first action on the protected resource further comprises:
comparing the set of attributes associated with the user and the second set of attributes of the resource specific access policy; and
allowing the user to perform first action upon determining that the set of attributes contains a minimum number of the second set of attributes.

13. The system of claim 6, wherein authorizing the user to perform the first action by comparing the set of attributes from the set of tags from the session token to the access policy associated with the resource is performed at least in part by at least one of an authorization proxy or the resource.

14. The system of claim 6, wherein the set of attributes of the user comprise at least one of a role with respect to the resource, an allowed action with respect to the resource, or an identifier of the user or account of the user.

15. The system of claim 6, wherein the resource comprises a restricted service associated with an online merchant interface provided by the computing resource service provider.

16. One or more non-transitory computer-readable storage media storing thereon executable instructions that, as a result of being executed by one or more processors of a computer system, cause the computer system to at least:
receive, by a credential exchange service provided by a computing resource service provider, a user token generated by an identity provider that provides authentication of an identity of a user and an identity of a service provided by the computing resource service provider;
determine a set of allowed actions, with respect to the service, for the user based on a set of attributes associated with the user;
generate a session token for interacting with the service by:
generating a set of tags that are based on the set of allowed actions for the account; and
attaching the set of tags to the session token; and
wherein upon receiving a request to access the service and the session token, authorize the user by comparing the set of allowed actions from the set of tags from the session token to an access policy associated with the service.

17. The one or more non-transitory computer-readable storage media of claim 16, wherein the instructions further include instructions that cause the computer system to:
generating the set of tags such that the session token does not exceed a threshold size.

18. The one or more non-transitory computer-readable storage media of claim 16, wherein the instructions further include instructions that cause the computer system to:
determine at least one role associated with the account of the user for the service based on the attributes of the user, wherein the set of allowable actions is determined based on the at least one role.

19. The one or more non-transitory computer-readable storage media of claim 16, wherein the instructions further include instructions that cause the computer system to:
wherein authorizing the user to perform the first action by comparing the set of attributes from the set of tags from the session token to the access policy associated with the resource is performed at least in part by at least one of an authorization proxy or the service.

20. The one or more non-transitory computer-readable storage media of claim 16, wherein the set of attributes of the user comprise at least one of a role with respect to the resource, an allowed action with respect to the resource, or an identifier of the user or account of the user.

* * * * *